US012560856B2

(12) United States Patent
Gwalani

(10) Patent No.: US 12,560,856 B2
(45) Date of Patent: Feb. 24, 2026

(54) MULTIFUNCTIONAL LIGHT-SHIELDING BUCKET

(71) Applicant: Freewell Industry Company Limited, Hong Kong (HK)

(72) Inventor: Hitesh Gopal Gwalani, Nagpur (IN)

(73) Assignee: Freewell Industry Company Limited, Hong Kong (HK)

( * ) Notice: Subject to any disclaimer, the term of this patent is extended or adjusted under 35 U.S.C. 154(b) by 590 days.

(21) Appl. No.: 18/069,235

(22) Filed: Dec. 21, 2022

(65) Prior Publication Data
US 2024/0210790 A1    Jun. 27, 2024

(51) Int. Cl.
*G02B 7/00* (2021.01)
*G03B 11/04* (2021.01)
*G02B 5/20* (2006.01)

(52) U.S. Cl.
CPC ............ *G03B 11/045* (2013.01); *G02B 7/006* (2013.01); *G02B 5/205* (2013.01)

(58) Field of Classification Search
CPC .......... G02B 7/00; G02B 7/006; G02B 7/003; G02B 7/021; G02B 27/28; G02B 27/281; G02B 5/20; G02B 5/205; G02B 5/30; G02B 5/3025; G03B 11/00; G03B 11/04; G03B 17/12; G03B 17/56; G03B 17/565; G03B 17/566; G03B 11/045

USPC .... 359/611, 491.01, 490.01, 490.02, 492.01, 359/738, 888, 890
See application file for complete search history.

(56) References Cited

U.S. PATENT DOCUMENTS 8,976,465 B2 * 3/2015 Meng ................... G03B 17/565
359/738

FOREIGN PATENT DOCUMENTS

| DE | 102014013398 A1 * | 3/2016 | ............. G02B 7/006 |
| JP | H11133483 * | 5/1999 | ............. G03B 11/04 |

OTHER PUBLICATIONS

English translation of JP H11133483. (Year: 1999).*
English translation of DE102014013398. (Year: 2016).*

* cited by examiner

*Primary Examiner* — Jie Lei

(57) ABSTRACT
A MULTIFUNCTIONAL LIGHT-SHIELDING BUCKET. A multifunctional light-shielding bucket comprises a light-shielding bucket body, an adjustable filter holder and a lens mounting ring. The light shielding bucket body comprises a light-shielding bucket frame and a light-shielding plate installed towards a front side of the light-shielding bucket body. The light-shielding bucket frame is coupled to the light-shielding plate via a mounting block and a connecting support. The lens mounting ring comprises a lens connecting thread for connecting the multifunctional light-shielding bucket to a camera lens.

19 Claims, 15 Drawing Sheets

208

210

211

214

216

212

218

104

316

306

302

304

308

106

MULTIFUNCTIONAL LIGHT-SHIELDING BUCKET

FIELD OF INVENTION

The utility model relates to a technical field of camera equipment. More particularly, but not exclusively, the subject matter relates to a multifunctional light shielding bucket.

BACKGROUND

While using a camera equipment, a light shielding bucket is generally installed towards the front side of the camera lens to control the extent of light exposure while capturing an image. The light shielding buckets currently used have a single function of either blocking light or have provisions to add any one special effect filter. Currently, the special effect filter that is used with the light shielding bucket is installed using a mechanical snap connection, that makes changing of filters while capturing different images cumbersome and complex. Moreover, the light shielding bucket currently being used, can accommodate a single filter at a time.

In view of the foregoing discussion, there is a need for a multi-functional light-shielding bucket that addresses the problems associated with conventional technology and enable the camera to modify the image being captured using a combination of filters under controlled light exposure. Further, a light shielding bucket with a design enabling filters to be mounted, unmounted, or modified with ease so that the best moments can be captured without any delay is required.

SUMMARY

In an embodiment, a multifunctional light-shielding bucket is disclosed. The multifunctional light-shielding bucket comprises a light-shielding bucket body, an adjustable filter holder and a lens mounting ring. The light shielding bucket body comprises a light-shielding bucket frame and a light-shielding plate installed towards a front side of the light-shielding bucket body. The light-shielding bucket frame is coupled to the light-shielding plate via a mounting block and a connecting support. The lens mounting ring comprises a lens connecting thread for connecting the multifunctional light-shielding bucket to a camera lens.

BRIEF DESCRIPTION OF DRAWINGS

Exemplary embodiments of the present invention will be understood and appreciated more fully from the following detailed description, taken in conjunction with the drawings in which.

DETAILED DESCRIPTION OF THE INVENTION

The following detailed description includes references to the accompanying drawings, which form part of the detailed description. The drawings show illustrations in accordance with example embodiments. The numerals in the figure represent like elements throughout the several views, exemplary embodiments of the present disclosure are described. For convenience, only some elements of the same group may be labelled with numerals. The purpose of the drawings is to describe exemplary embodiments and not for production. Therefore, features shown in the figures are chosen for convenience and clarity of presentation only. Further, the figures were drawn out of scale. Moreover, the language used in this disclosure has been principally selected for readability and instructional purposes and may not have been selected to delineate or circumscribe the inventive subject matter, resort to the claims being necessary to determine such inventive subject matter. These example embodiments are described in enough details to enable those skilled in the art to practice the present subject matter. However, it will be apparent to one of ordinary skill in the art that the present invention may be practiced without these specific details. The embodiments can be combined, other embodiments can be utilized, or structural and logical changes can be made without departing from the scope of the invention. The following detailed description is, therefore, not to be taken as a limiting sense.

In this document, the terms "a" or "an" are used, as is common in patent documents, to include one or more than one. In this document, the term "or" is used to refer to a non-exclusive "or," such that "a or b" includes "a but not b," "b but not a," and "a and b," unless otherwise indicated.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the description of the present invention, it should be understood that the terms "center", "longitudinal", "lateral", "length", "width", "thickness", "upper", "lower", "front", "back", "left", "right", "vertical", "horizontal", "top", "bottom", "inner", "outer", "clockwise", "counterclockwise" etc. or the positional relationship is based on the orientation or positional relationship shown in the accompanying drawings, which is only for the convenience of describing the present invention and simplifying the description, rather than indicating or implying that the referred device or element must have a specific orientation, be constructed in a specific orientation and operation. Therefore, it cannot be construed as a limitation to the present invention.

Figure 1:
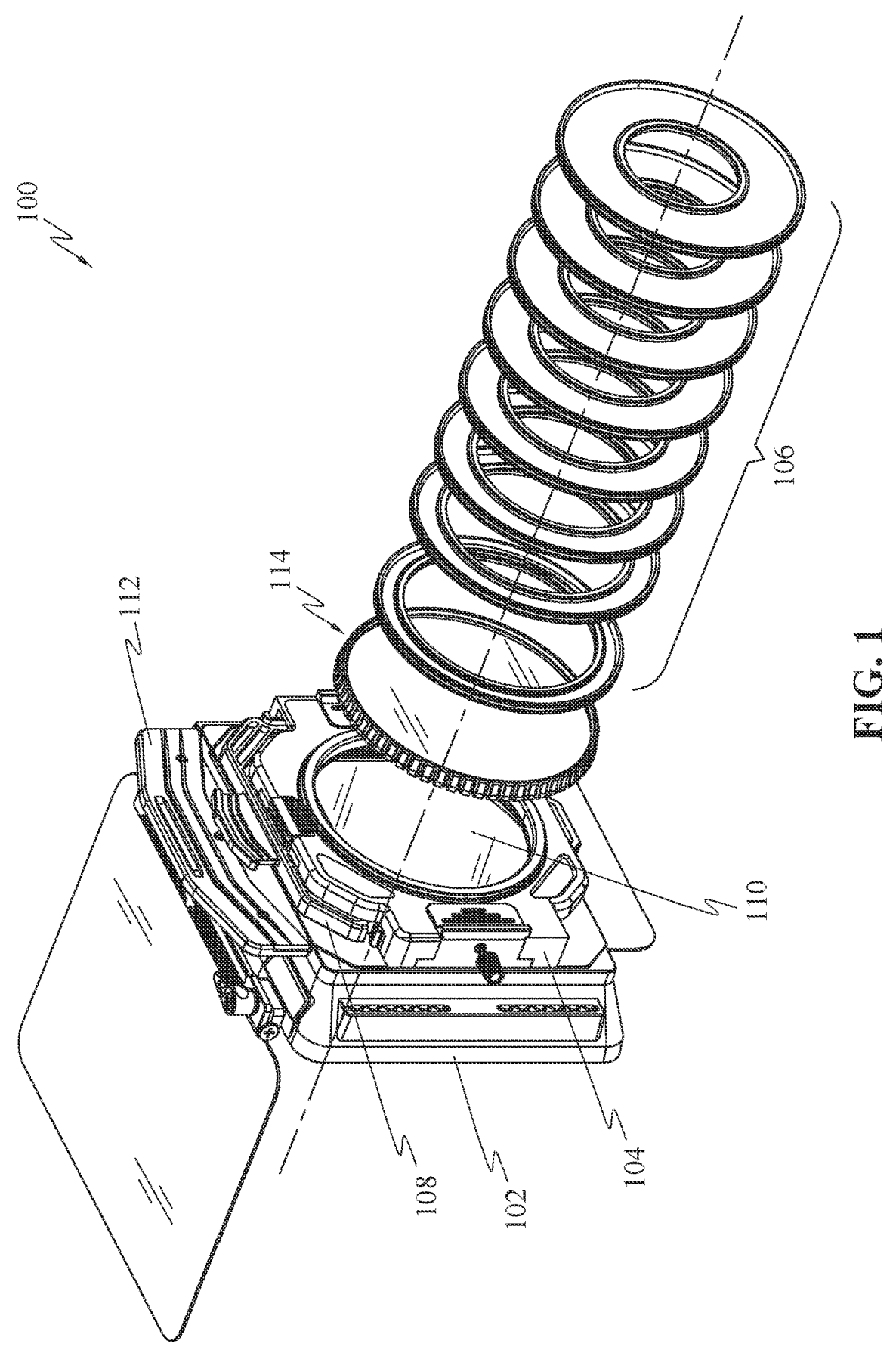
FIG. 1 illustrates an exploded perspective view of a multifunctional light-shielding bucket 100, in accordance with an embodiment.

FIG. 1 illustrates a multifunctional light-shielding bucket 100, in accordance with an embodiment. The multifunctional light-shielding bucket 100 may comprise a light-shielding bucket body 102, a filter fixing bracket 104, an adjustable filter holder 108, a special effect filter 110, a lens mounting ring 106 and a lens cover 114. The multifunctional light-shielding bucket 100 may comprise of a front side and a rear side. The front side of the multifunctional light-shielding bucket 100 may be disposed such that the front side faces an object of interest whose image is required to be captured. The rear side of the multifunctional light-shielding bucket 100 may be configured to be either coupled to the lens of a camera equipment that may be used to capture the image of the object of interest or may be covered using the lens cover 114, when not in use.

In an embodiment, the light-shielding bucket body 102 may comprise a rear side that may be configured to be clamped to a front side of the filter fixing bracket 104. The filter fixing bracket 104 may be configured to accommodate a graduated neutral density (GND) filter 112, the adjustable filter holder 108, and the special effect filter 110. Further, the filter fixing bracket 104 may comprise a rear side that may be configured to accommodate the lens mounting ring 106. The lens mounting ring 106 may be configured to be coupled to a camera lens via threads provided on the lens mounting ring 106 for the purpose of mounting the multifunctional light-shielding bucket 100 onto the camera equipment.

Figure 2A:
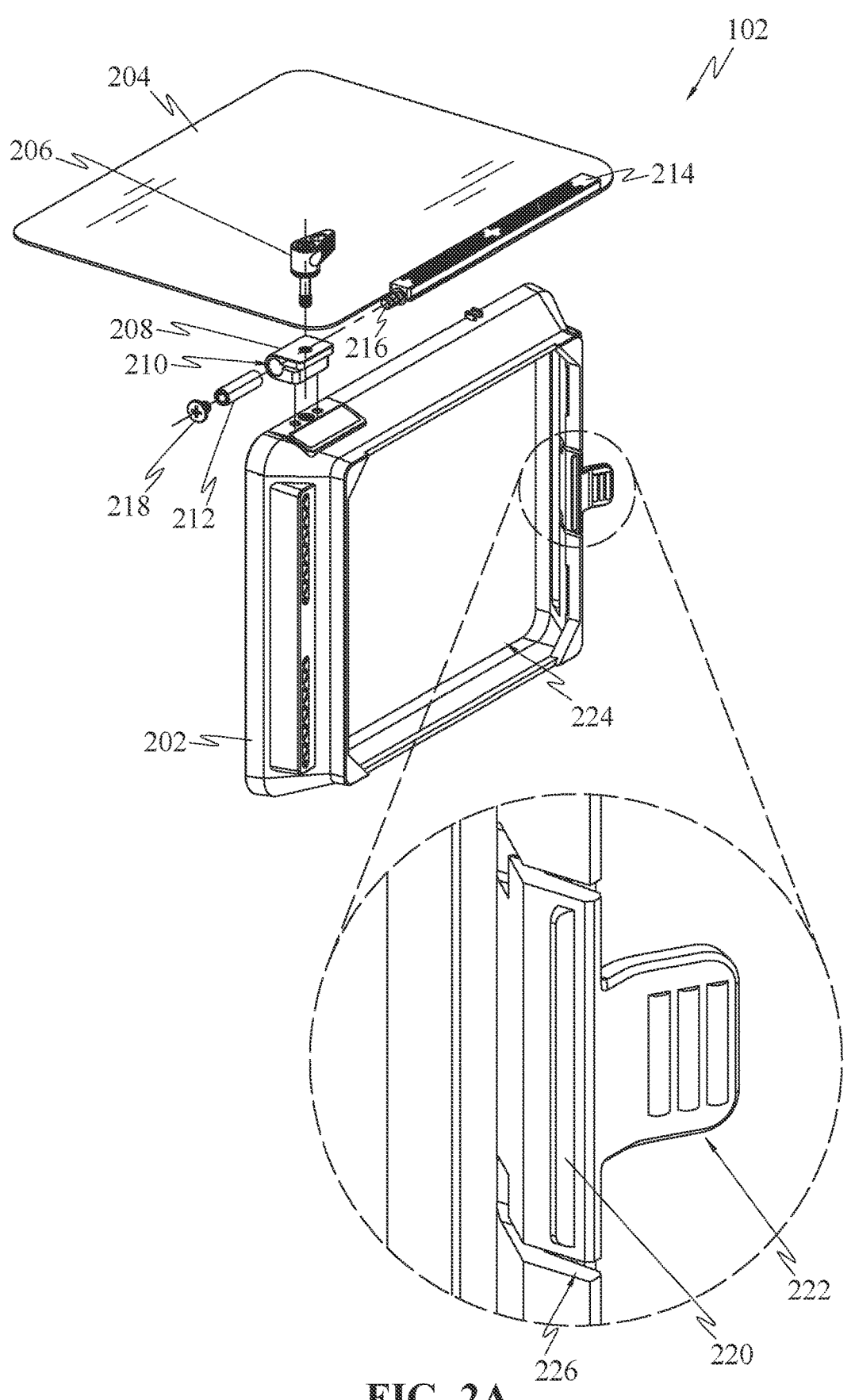
FIG. 2A illustrates a perspective view of a light-shielding bucket body 102, in accordance with an embodiment.
Figure 2B:
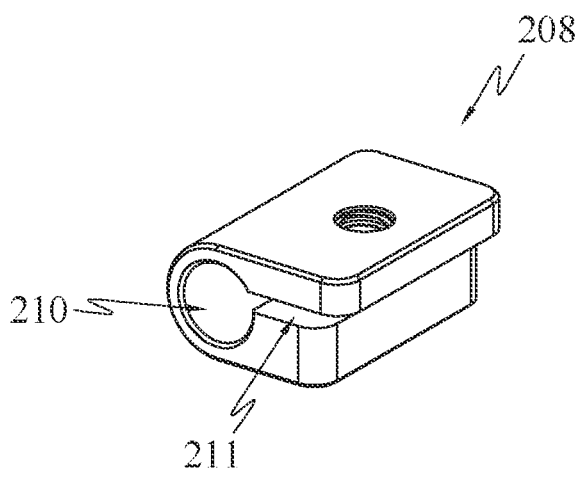
FIG. 2B illustrates a side view of a mounting block 208, in accordance with an embodiment.
Figure 2C:
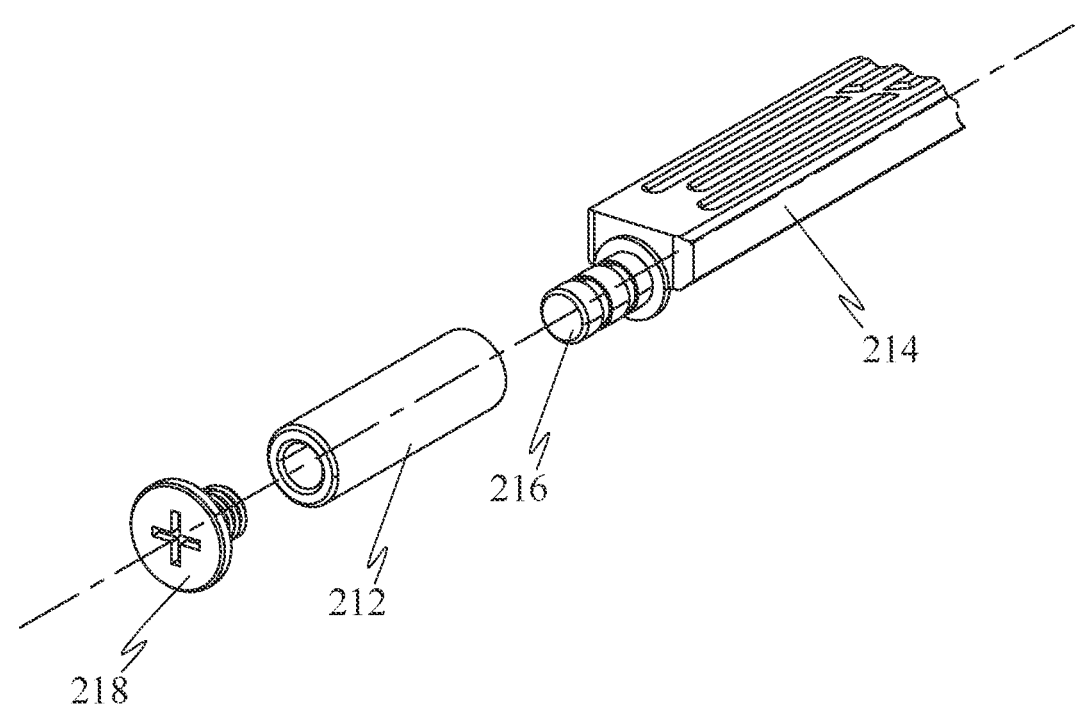
FIG. 2C illustrates a side view of a connecting support 214 receiving a damping sleeve 212, in accordance with an embodiment.

Referring to FIGS. 2A-2C, the light-shielding bucket body 102 may comprise of a light-shielding bucket frame 202, a light-shielding plate 204, a connecting support 214 with a damping pin 216, a fastening bolt 206 and a mounting block 208.

In an embodiment, the light-shielding bucket frame 202 may define an aperture 224, wherein the aperture 224 may be configured to expose the front side of the multifunctional light shielding bucket 100 to the camera lens. The light-shielding bucket frame 202 may be provided with a pair of longitudinal protruding members 220 on at least one of its inner walls. An actuating member 222 may be provided on one side of the light-shielding bucket frame 202. The actuating member 222 may be provided with slits 226 on its lateral sides. The actuating member 222 may be connected to the light-shielding bucket body 102 through its longitudinal side. This arrangement of the actuating member 222 with the light-shielding bucket frame 202 enables the actuating member 222 to be flexible with respect to the light-shielding bucket frame 202. At least one of the longitudinal protruding members 220 may be provided on the actuating member 222 in a manner that the at least one of the longitudinal protruding members 220 faces the aperture 224 of the light-shielding bucket frame 202. At least another of the longitudinal protruding members 220 may be provided on the light-shielding bucket frame 202 opposite to the actuating member 222.

In an embodiment, the light-shielding plate 204 may be engaged with the connecting support 214 via any known mechanical coupling means. The connecting support 214 may be provided with the damping pin 216 on at least one of its longitudinal ends.

In an embodiment, the mounting block 208 may be configured to couple the light shielding plate 204 to the light-shielding bucket frame 202 via the connecting support 214. The mounting block 208 may comprise a cylindrical groove 210. The mounting block 208 may define a gap 211 that extends laterally from one side of the cylindrical groove 210. The cylindrical groove 210 may be configured to receive a damping sleeve 212, wherein the damping sleeve 212 may be, but not limited to, a hollow member. The mounting block 208 may be engaged to the light-shielding bucket frame 202 using screws or any known mechanical coupling means, in a manner that a bottom surface of the mounting block 208 may interface with at least a portion of the light-shielding bucket frame 202. In addition, the fastening bolt 206, that is configured to pass through the gap 211, may be used to tighten the gap 211 which in turn enables a firm grip over the damping sleeve 212 within the cylindrical groove 210, when the damping sleeve 212 is received within the cylindrical groove 210.

In an embodiment, the damping sleeve 212 may comprise a first side and a second side. The first side of the damping sleeve 212 may be disposed longitudinally opposite to the second side of the damping sleeve 212. The damping sleeve 212 may define a hole towards the first side and the second side. The hole towards the first side of the damping sleeve 212 may be configured to receive the damping pin 216. The damping pin 216 may be rotatably coupled to the damping sleeve 212. The hole towards the second side of the damping sleeve 212 may be configured to receive a limit screw 218.

The damping pin 216 may be configured to rotatably couple the connecting support 214 to the mounting block 208. The light-shielding plate 202 may be configured to realize a rotational adjustment function via the damping pin 216 via the connecting support 214. The damping pin 212 may enable the light shielding plate 204 to either cover the aperture 224 of the light-shielding bucket frame 202 towards the front side of the multifunctional light-shielding bucket 100 or expose the aperture 224 of the light-shielding bucket frame 202.

In an embodiment, the light-shielding bucket body 102 may be detachably coupled to the filter fixing bracket 104 via the pair of longitudinal protruding members 220 provided on the light-shielding bucket frame 202. The pair of longitudinal protruding members 220 may be configured to snap on to the front side of the filter fixing bracket 104 by operating the actuating member 222. During operation, at least one of the pair of longitudinal protruding members 220 provided on the actuating member 222 may move away from the aperture 224 of the light-shielding frame 202 on pressing the actuating member 222. Further, the aperture 224 of the light-shielding frame 202 may accommodate the filter fixing bracket 104 within the light-shielding frame 202 towards the rear side while continuing to keep the actuating member 222 pressed. On releasing the actuating member 222, the longitudinal protruding members 220 may be configured to rigidly hold the filter fixing bracket 104.

In furtherance, the filter fixing bracket 104 may be disengaged from the light-shielding bucket frame 202. On pressing the actuating member 222, at least one of the pair of protruding members 220 may be configured to move away from the filter fixing bracket 104 thereby disengaging the filter fixing bracket 104 from light-shielding bucket frame 202.

Figure 3A:
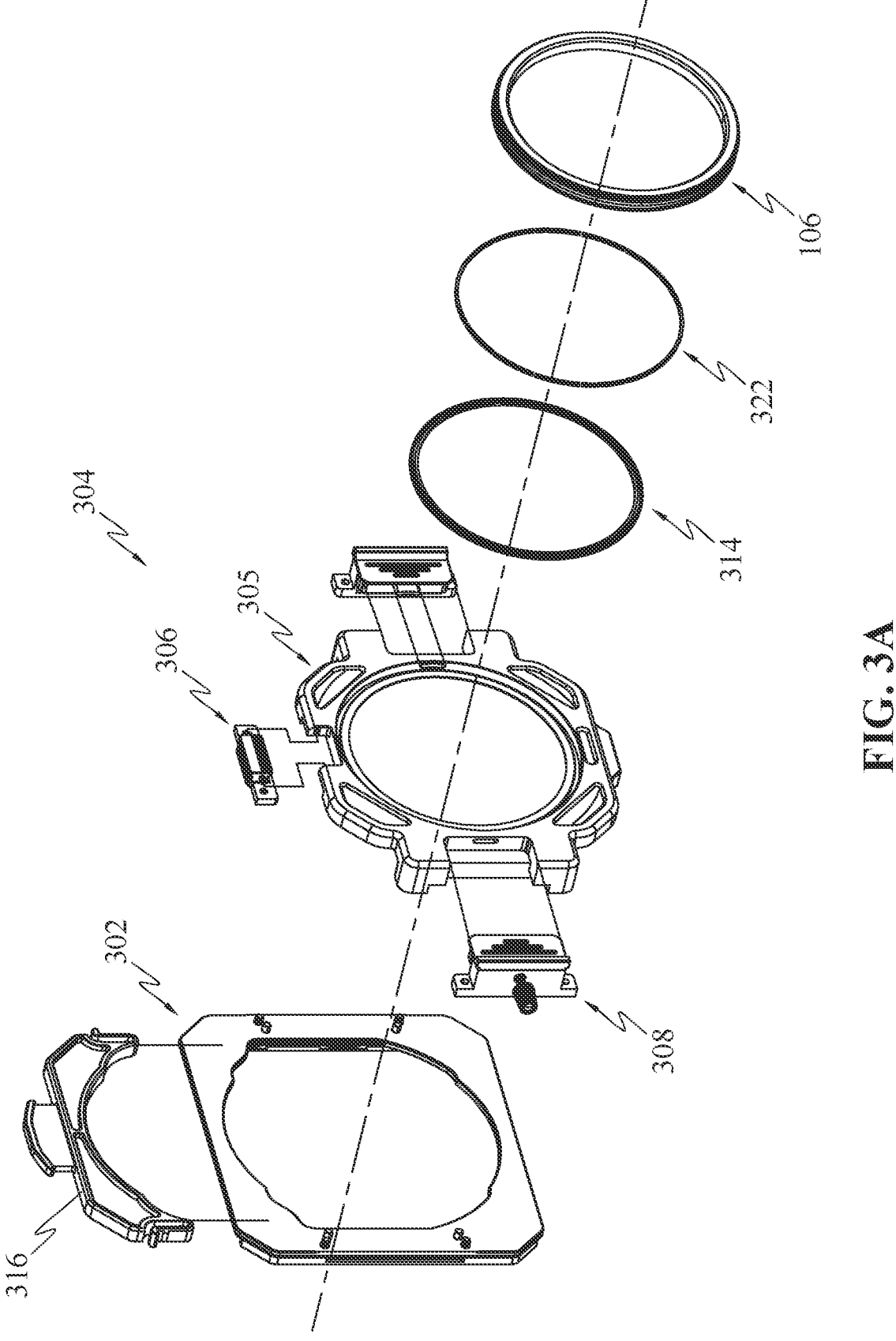
FIG. 3A illustrates an exploded view of a filter fixing bracket 104, in accordance with an embodiment.

Referring to FIG. 3A an exploded view of the filter fixing bracket 104 is illustrated, in accordance with an embodiment. The front side of the filter fixing bracket 104 may be configured to be engaged with the light-shielding bucket body 102 via the light shielding bucket frame 202. The filter fixing bracket 104 may comprise a graduated neutral density (GND) filter holder assembly 302, a filter base assembly 304 and a filter slot cover 316. The filter base assembly 304 may comprise a filter base frame 305, a magnetic button 306, and at least one ring locking means 308.

In an embodiment, the filter base assembly 304 may comprise of a magnetic suction limit ring 314 disposed towards the rear side of the filter base frame 305. The filter base assembly 304 may be provided with a series of strong magnets 322, wherein the series of strong magnets 322 may be received within the magnetic suction limit ring 314. The magnetic suction limit ring 314 may be engaged to the filter base frame 305 via a threaded coupling between the magnetic suction limit ring 314 and the filter base frame 305.

Figure 3B:
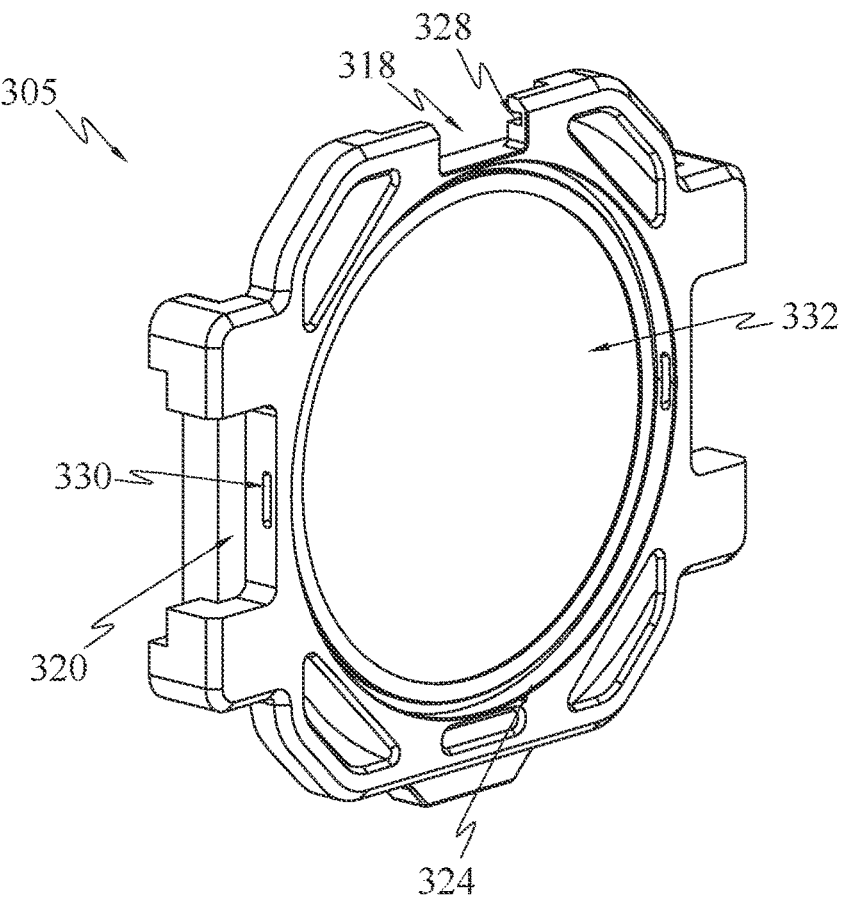
FIG. 3B illustrates a perspective view of a filter base frame 305, in accordance with an embodiment.

Referring to FIG. 3B, the filter base frame 305 may be provided with a rectangular slot 318. The rectangular slot 318 may be disposed on a middle portion towards a top edge of the filter base frame 305. The rectangular slot 318 may be configured to receive the magnetic button 306. Further, the filter base frame 305 may comprise a pair of holder grooves 328 on lateral sides of the rectangular slot 318 towards a front side of the filter base frame 305. The pair of holder grooves 328 may be configured to rigidly hold the magnetic button 306 within the rectangular slot 318.

In an embodiment, the filter base frame 305 may comprise at least one ring locker slot 320 disposed on each lateral side of the filter base frame 305. Each of the ring locker slots 320 may be provided with a clamper slot 330, in a manner that the clamper slot 330 may provide access from the ring locker slots 320 to an aperture 332 of the filter base frame 305. The ring locking means 308 may be received by each of the ring locker slots 320.

In an embodiment, a first ring adapter slot 324 may be disposed towards the rear side of the filter base frame 305. At least a portion of the first ring adapter slot 324 may be provided with a threaded portion.

Figure 3C:
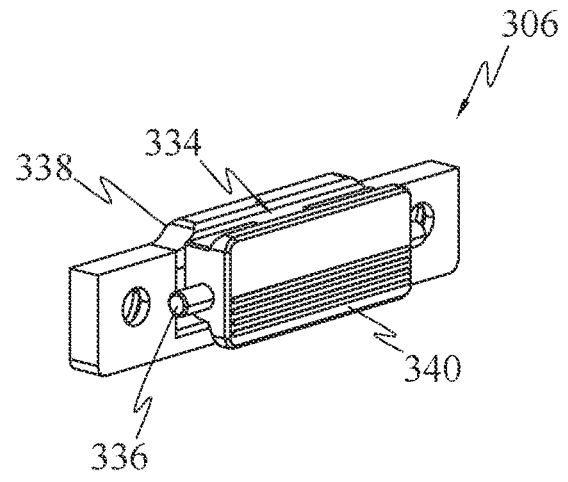
FIG. 3C illustrates a perspective view of a magnetic button 306, in accordance with an embodiment.

Referring to FIG. 3C, the magnetic button 306 may comprise a first portion 338, a magnetic suction limiter portion 334 and a second portion 340. In an embodiment, the first portion 338 of the magnetic button 306 may be disposed towards the front side of filter base frame 305 while the second portion 340 may be disposed towards the rear side of the filter base frame 305. The first portion 338 of the magnetic button 306 may be secured onto the filter base assembly 304 using M3 screws. Further, the first portion 338 may be coupled to the second portion 340 of the magnetic button 306 via a connecting rod 336. The connecting rod 336 may extend sideways slightly beyond lateral sides of the second portion 340.

In an embodiment, the magnetic suction limiter portion 334 may extend from an inner wall of the second portion 340 towards a front side of the filter base frame 305. The first portion 338 of the magnetic button may comprise a slot to accommodate at least a portion of the magnetic suction limiter portion 334 such that the magnetic suction limiter portion 334 may extend outwardly, and slightly beyond the first portion 338 of the magnetic button 306 towards the front side of the filter base frame 305.

During assembly, the extended portions of the connecting rod 336 may be configured to snugly fit into the holder grooves 328 on the filter base frame 305 for mounting the magnetic button 306 onto the rectangular slot 318 of the filter base frame 305. Further, when the adjustable filter holder 108 is assembled into the adjustable filter holder assembly 104, the magnetic suction limiter portion 334 may be configured to engage with the adjustable filter holder 108. Also, the magnetic suction limiter portion 334 may be configured to operatively engage with the adjustable filter holder 108 when the adjustable filter holder 108 is installed within a filter slot 310 (FIG. 3E).

Figure 3D:
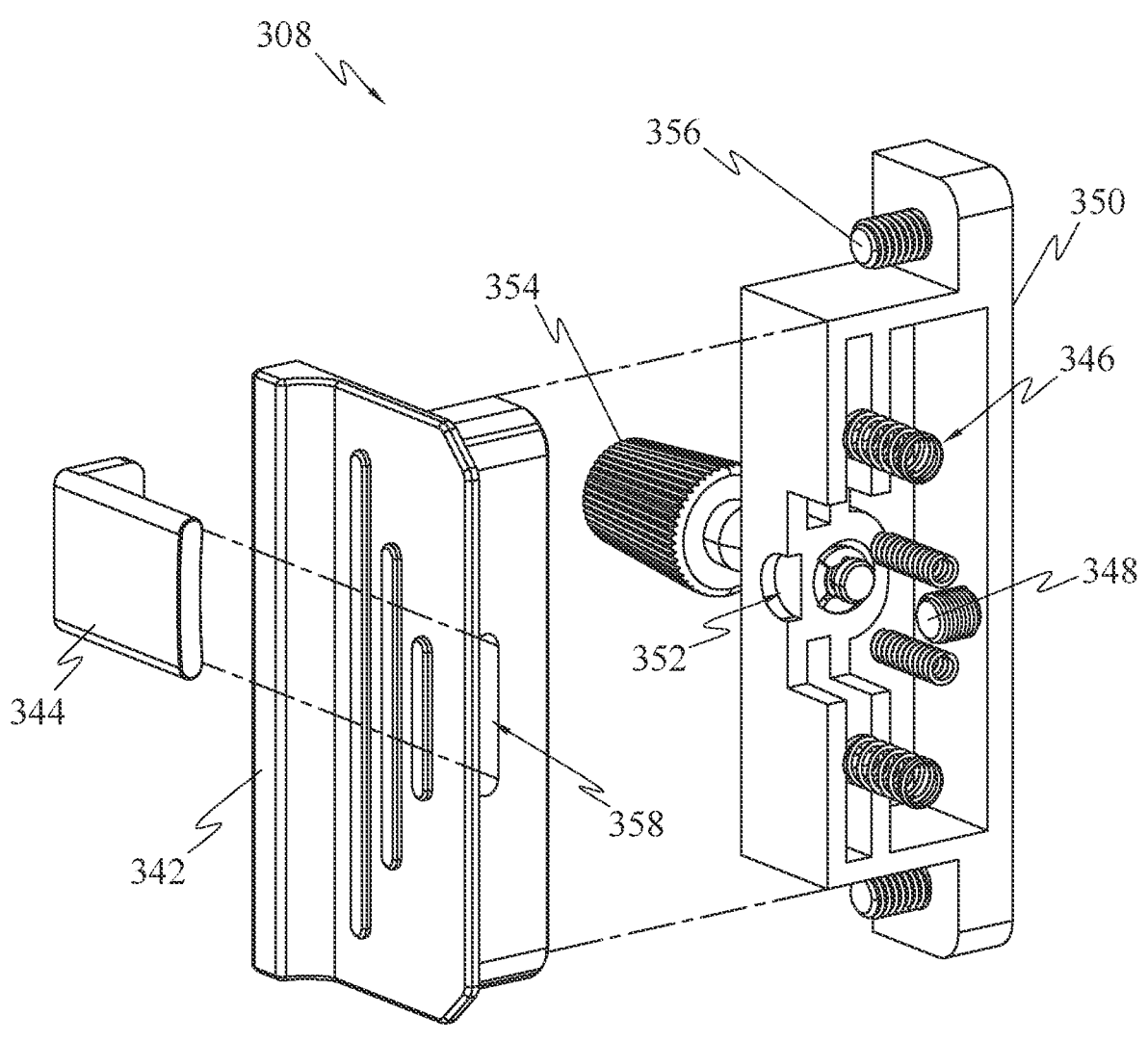
FIG. 3D illustrates a ring locking means 308, in accordance with an embodiment.
Figure 3E:
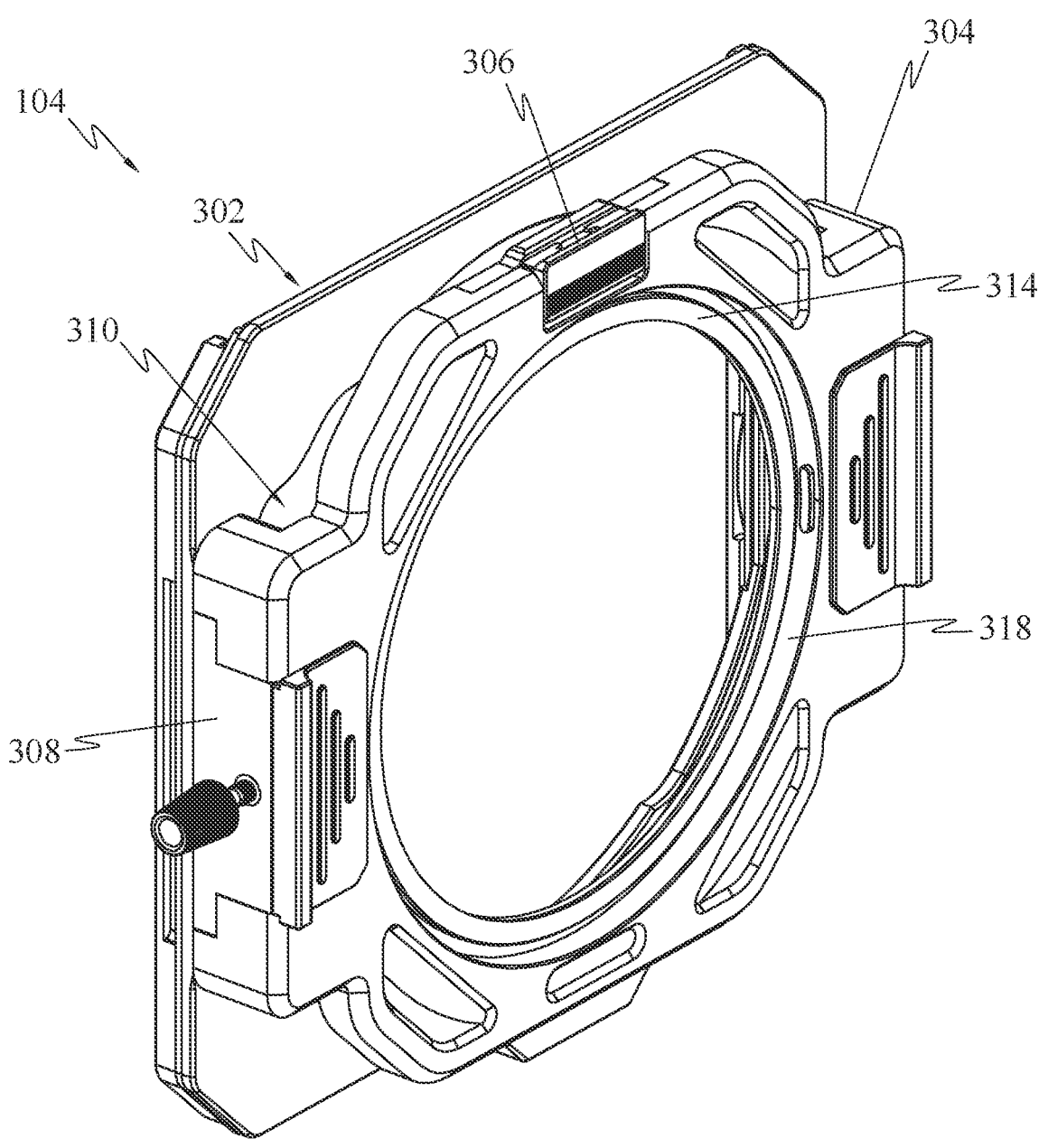
FIG. 3E illustrates coupling of a graduated neutral density (GND) filter holder assembly 302 with a filter base assembly 304, in accordance with an embodiment.

Referring to FIG. 3D, the ring locking means 308 may comprise a sliding block 342 and a stopper 350. The sliding block 342 may comprise an L-shaped clamping block 344. The L-shaped clamping block 344 in the ring locking means 308 may be coupled to the sliding block 342 via the clamping slot 330. The L-shaped clamping block 344 may comprise a first end and a second end. The first end of L-shaped clamping block 344 may be coupled to the sliding block 342, while the second end of the L-shaped clamping block 344 may be disposed within the first ring adapter slot 324 of the filter base frame 305 via the clamper slots 330.

In an embodiment, the stopper 350 may comprise a plurality of springs 346, a limit post 348, a limiting slot 352 and a fastening screw 354. The fastening screw 354 may be disposed such that the fastening screw 354 may penetrate the stopper 350. Further, the fastening screw 354 may be provided in at least one ring locking means 308.

The ring locking means 308 may be operated in the manner discussed herewith. At first, a suitable lens mounting ring 106 may be selected. The sliding block 342 may be configured to be slid outwards to accommodate the lens mounting ring 106 within the first ring adapter slot 324 towards the rear side of the filter base frame 305. The sliding movement of the sliding block 342 may be limited by the springs 346 on the stopper 350. The sliding block 342 may be configured to drive the second end of the L-shaped clamping block 344 inwards and in a direction that is oriented away from the inner wall of the filter base frame 305, until the L-shaped clamping block 344 comes in contact with the limit post 348 (within the stopper 350) while compressing the springs 346 (within the stopper 350). The limit post 348 may be configured to limit the outward movement of the sliding block 342.

The L-shaped clamping block 344 may be configured to securely engage the lens mounting ring 106 on the filter base frame 305. Consequently, the sliding block 342 may be released after the lens mounting ring 106 is placed within the first ring adapter slot 324 such that the springs 346 may retrieve to push the L-shaped clamping block 344. The second end of the L-shaped clamping block 344 may be configured to snugly hold the lens mounting ring 106 when the sliding block 342 may be released thereby enabling the snap fitting action of the L-shaped clamping block 344. The plurality of springs 346 may be configured to enable the snap fitting movement of the L-shaped clamping block 344. Further, the fastening screw 354 may be tightened to rigidly hold the lens mounting ring 106 in the required position, thereby providing additional grip over the lens mounting ring 106 when it is placed in the first ring adapter slot 324. The locking of the ring locking means 308 enables the fixation between the camera lens and the filter fixing bracket 104 via the lens mounting ring 106.

In an embodiment, the GND filter holder assembly 302 may be coupled to the filter base assembly 304 using, but not limited to, M2 screws.

Referring to FIG. 3E, the front side of the filter base assembly 304 may be engaged to the rear side of the GND filter holder assembly 302 in a manner that the filter slot 310 may be defined between the rear side of the GND filter holder assembly 302 and the front side of the filter base assembly 304.

In an embodiment, the filter slot 310 may be configured to accommodate the adjustable filter holder 108, whenever required. The magnetic button 306 on the filter base frame 305, may be configured to engage with the adjustable filter holder 108 when the adjustable filter holder 108 is slid into the filter slot 310.

Figure 3F:
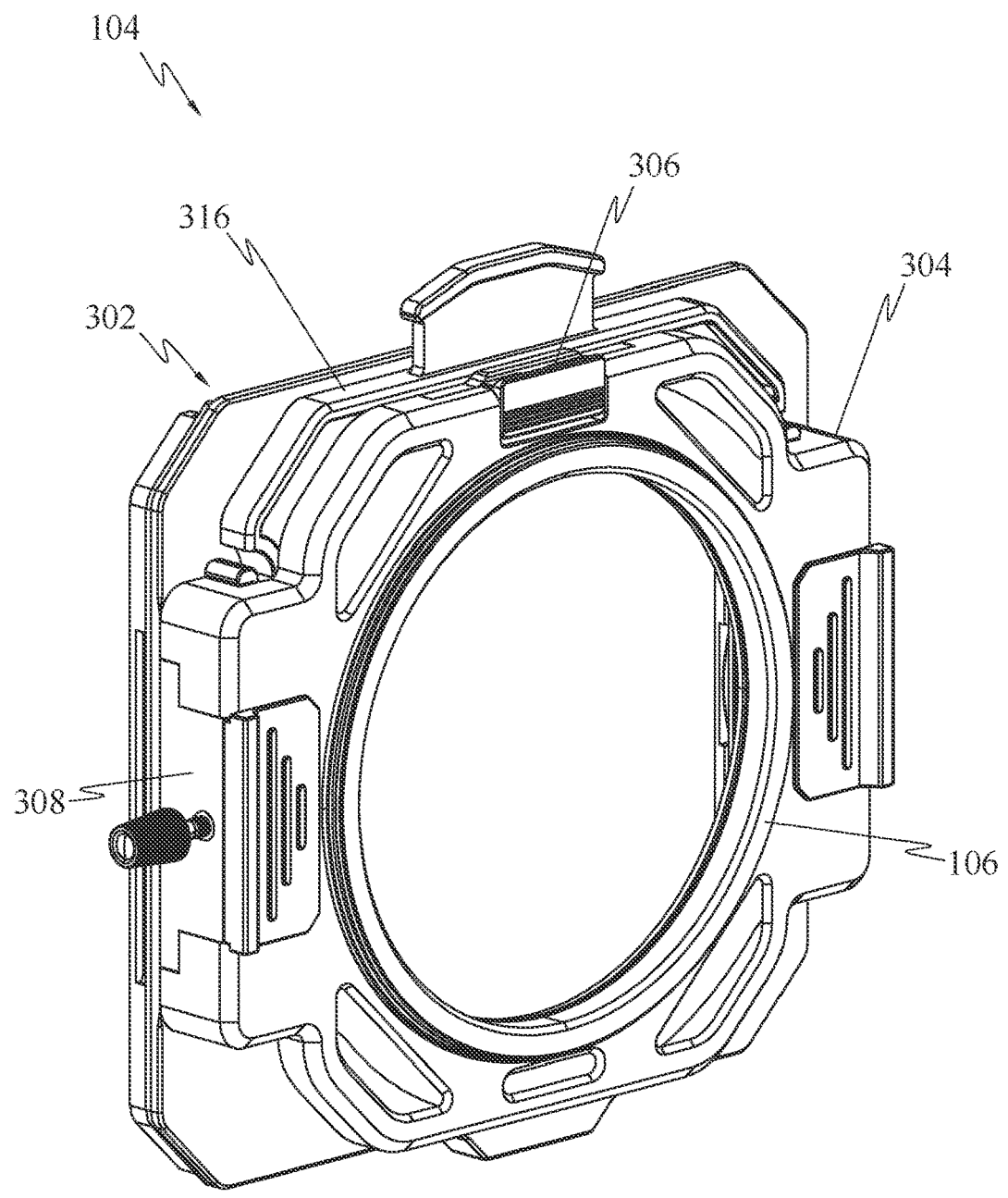
FIG. 3F illustrates the filter fixing bracket 104 along with a filter slot cover 316, in accordance with an embodiment.

Referring to FIG. 3F, the filter slot 310 may be covered using the filter slot cover 316 when the adjustable filter holder 108 is not in use, while using the multifunctional light shielding bucket 100. The filter slot cover 316 may be configured to block light from entering through the empty filter slot 310 that may in turn affect the final captured image. The filter slot cover 316 may thus be employed so that the final captured images are not affected by the interfering rays of light.

Figure 4A:
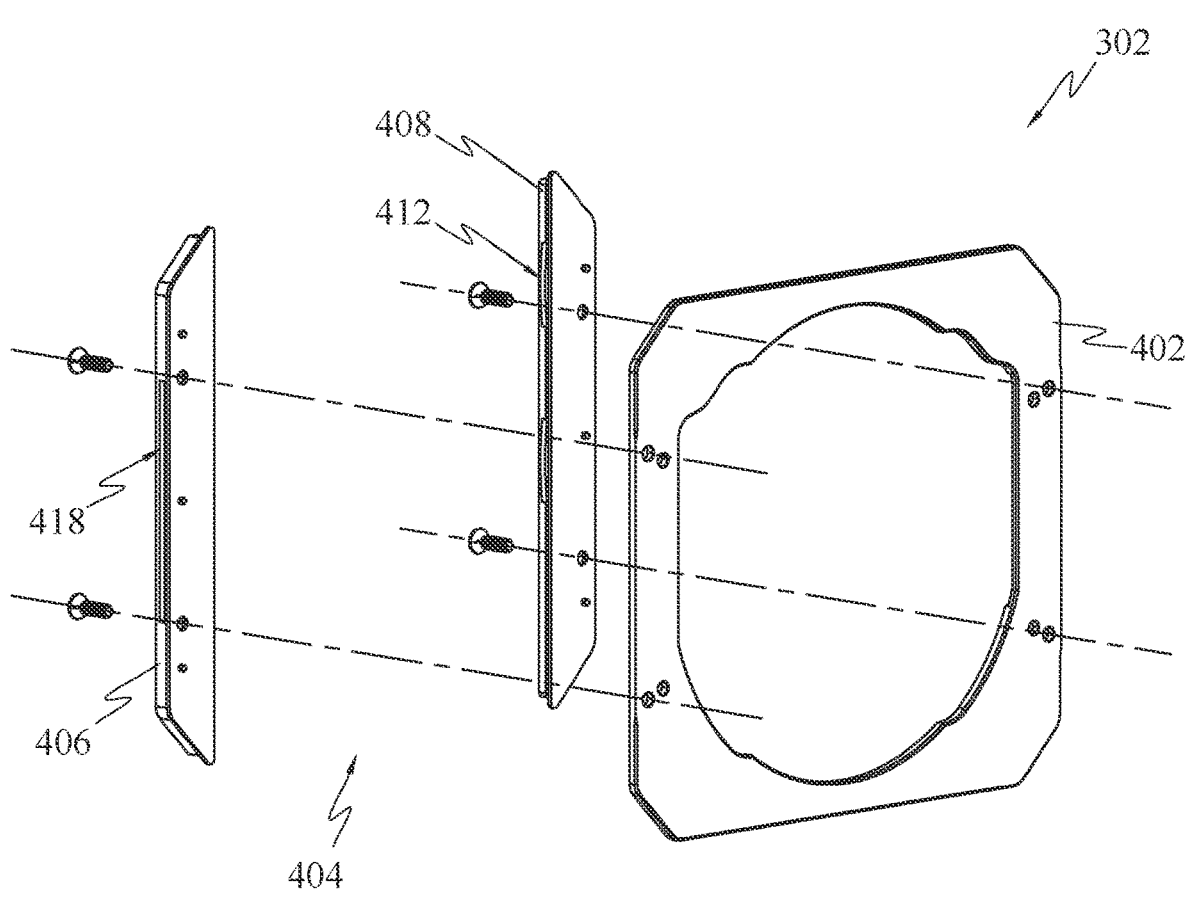
FIG. 4A is an illustration of an exploded view of the GND filter holder assembly 302, in accordance with an embodiment.
Figure 4B:
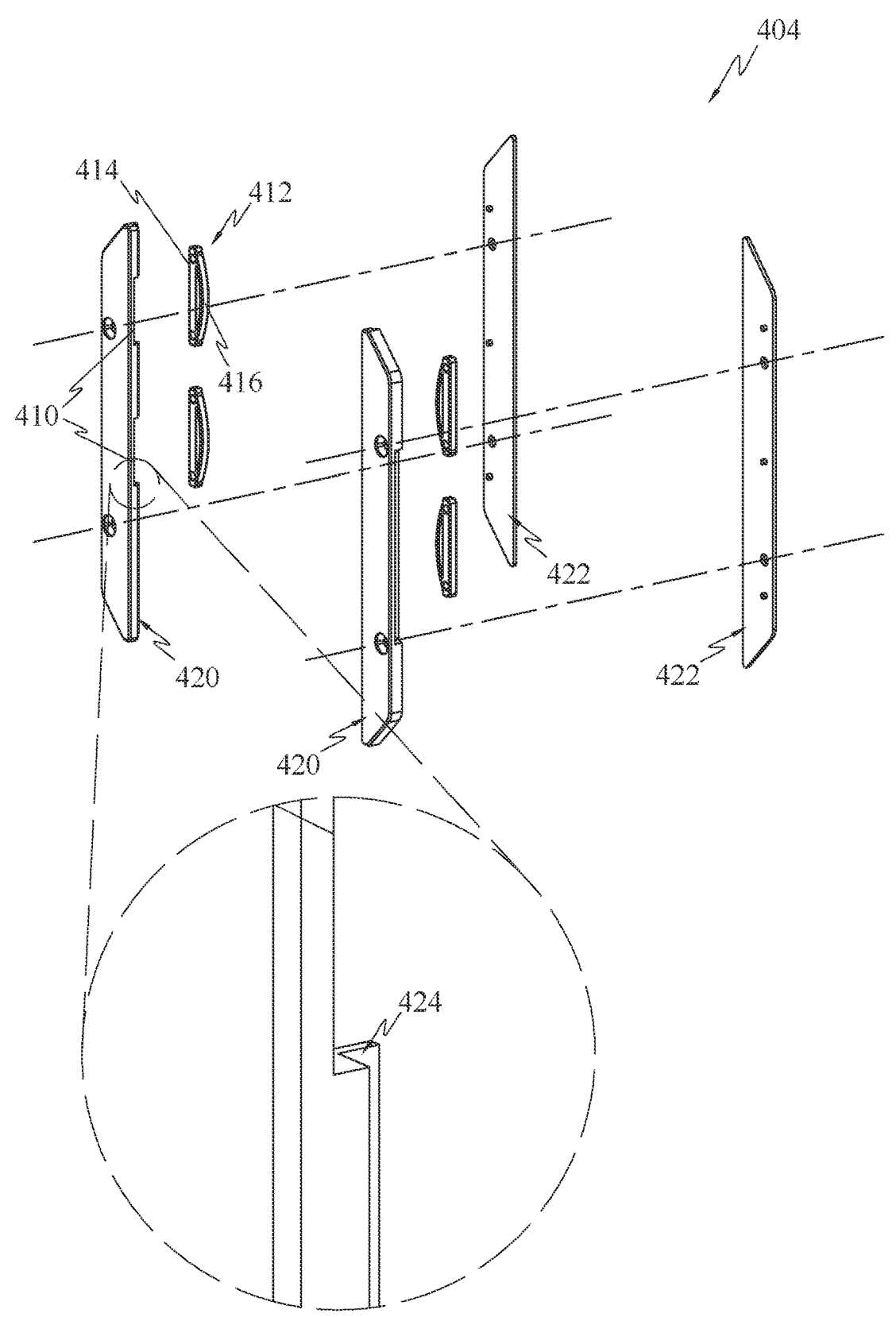
FIG. 4B is an illustration of an exploded view of a pair of clamping members 404, in accordance with an embodiment.

Referring to FIGS. 4A-4B illustrates exploded views of the GND filter holder assembly 302, in accordance with an embodiment. The GND filter holder assembly 302 may be configured to be engaged to the rear side of light shielding bucket body 102, during assembly.

In an embodiment, the GND filter holder assembly 302 may comprise a first frame 402 and a pair of clamping members 404. The first frame 402 may be coupled to the pair of clamping members 404 using, but not limited to, M3 screws. Each of the clamping members 404 may comprise a first plate 420 and a second plate 422. The first plate 420 and the second plate 422 define a plurality of holes. The first plate 420 and the second plate 422 may be coupled by a fastening means for example but not limited to screws that pass through the holes defined in the first plate 420 and the second plate 422.

The pair of clamping members 404 may be disposed on lateral sides towards a front side of the first frame 402. Each of the clamping members 404 may comprise an outer wall 406 and an inner wall 408. The outer wall 406 of each of the clamping members 404 may be provided with installation slots 418. Further, the inner wall 408 of each of the clamping members 404 may be provided with a GND slot 424 and a pair of first grooves 410. The GND slot 424 may be disposed on the inner wall 408 in the longitudinal direction. The pair of first grooves 410 may be disposed at a distance from each other.

In an embodiment, each of the clamping members 404 may comprise a pair of gripping members 412. Each of the first grooves 410 may receive the corresponding gripping members 412. Further, each of the gripping members 412 may comprise a first side 414 and a second side 416. The first side 414 of the gripping member 412 may be, but not limited to be, non-flexible. The second side 416 of the gripping member 412 may be, but not limited to be, flexible. The gripping members 412 may be disposed within each of the first grooves 410 such that the first side 414 may be embedded within the first groove 410, while the second side 416 of each of the gripping member 412 may protrude slightly beyond the inner wall 408 of the first clamping members 404. Further, a profile of the second side 416 of the gripping member may be, but not limited to, convex-shaped.

Each of the first clamping members 404 may be configured to be coupled to the first frame 402.

Figure 4C:
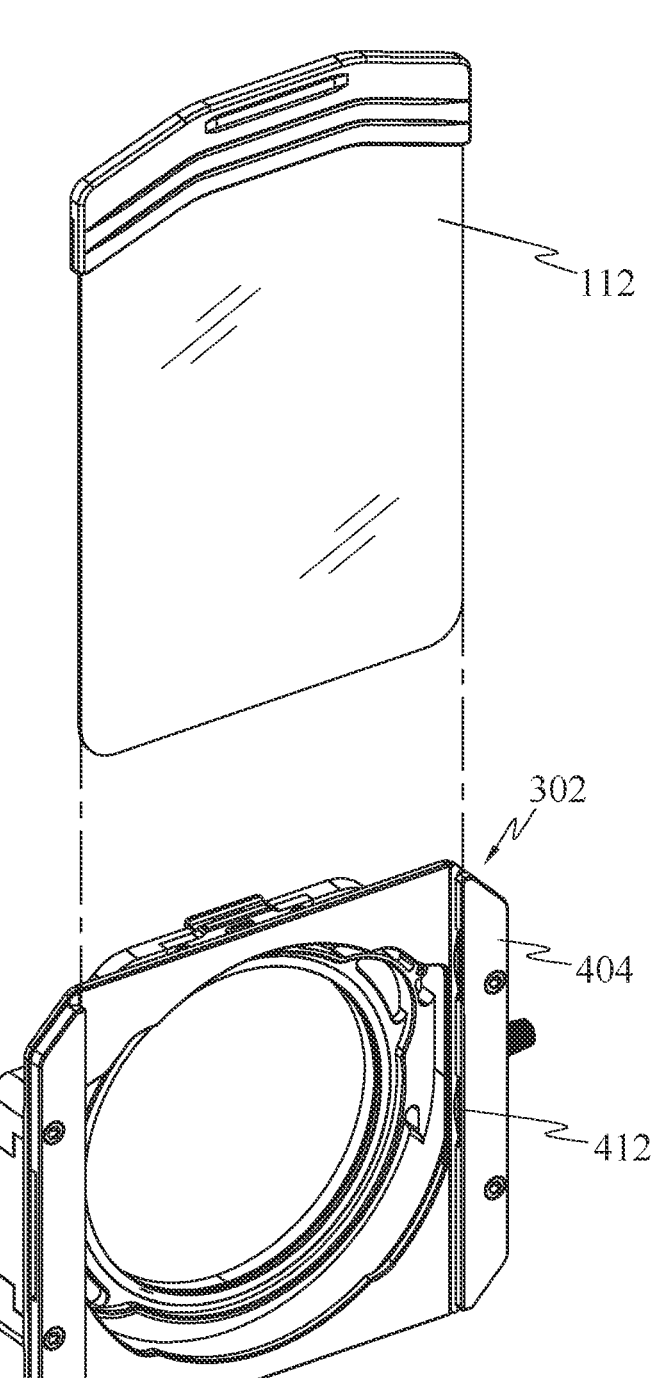
FIG. 4C illustrates the filter fixing bracket 104 and a graduated neutral density (GND) filter 112, in accordance with an embodiment.

Referring to FIG. 4C, the GND filter holder assembly 302 may be configured to accommodate the GND filter 112, such that, the GND filter 112 may slide into the GND slot 424 in a manner that the GND filter 112 may be positioned between the inner walls 408 of the pair of first clamping members 404. Further, the flexible second side 416 of each gripping member 412 may be slightly deformed while being pushed towards first side 414 of the gripping member 412 to accommodate the GND filter 112 rigidly into the GND filter holder assembly 302. The flexible second side 416 of each gripping member 412 may be configured to return to its original shape when the GND filter 112 is dislodged from the GND filter holder assembly 302.

In furtherance, the installation slots 418 may be configured to enable the light shielding body 102 to be mounted onto the filter fixing bracket 104. During assembly, each of the installation slot 418 on each of the first clamping members 404 may be configured to engage with the corresponding actuating members 222 on the light shielding body 102, thereby engaging the front side of the filter fixing bracket 104 with the rear side of light-shielding bucket body 102.

Figure 5:
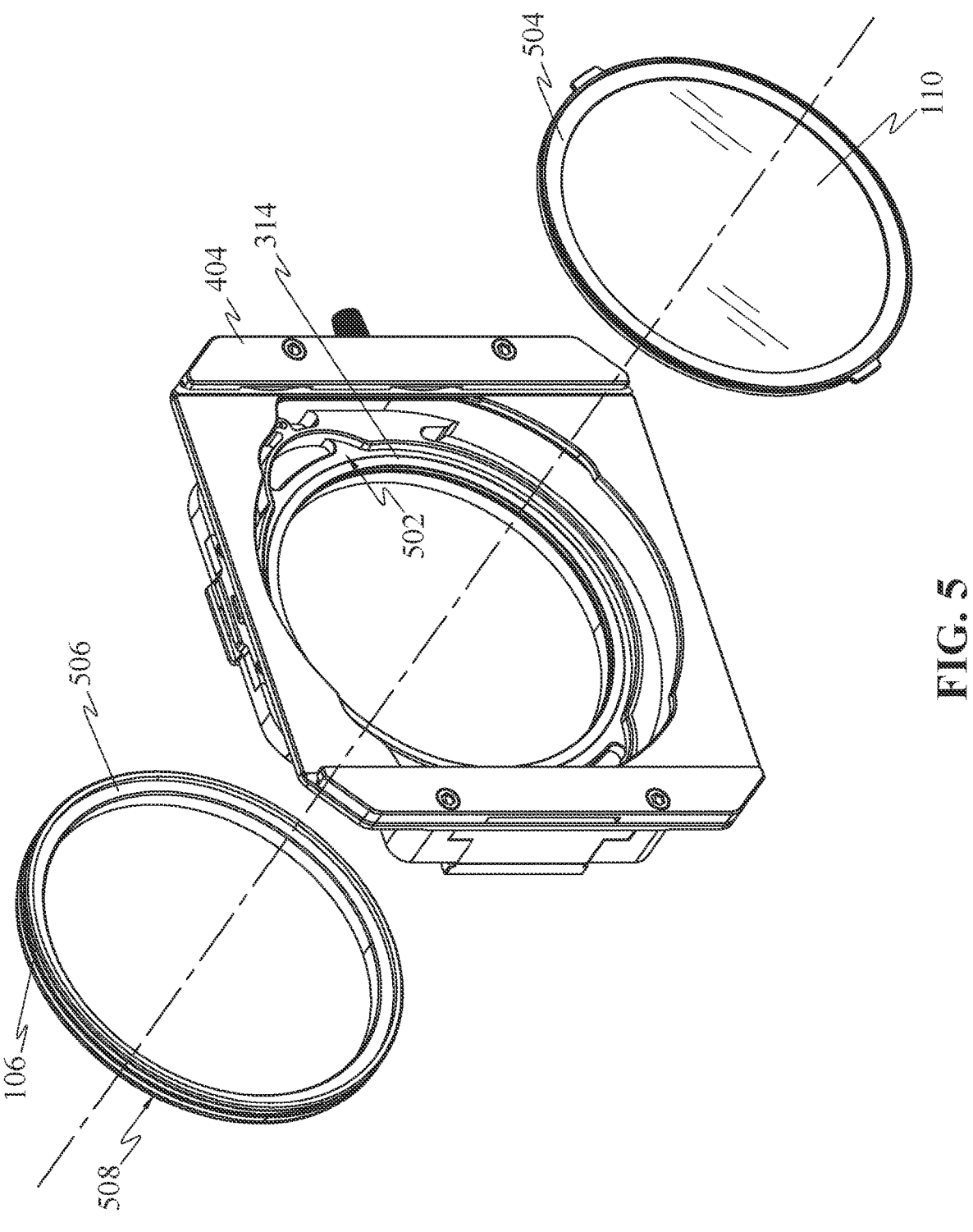
FIG. 5 illustrates the filter fixing bracket 104 with a lens mounting ring 106 and a special effect filter 110, in accordance with an embodiment.

Referring to FIG. 5 the coupling of the lens mounting ring 106 and the special effect filter 110 with the filter fixing bracket 104 is illustrated, in accordance with an embodiment. The lens mounting ring 106 may comprise an outer periphery and an inner periphery. The lens mounting ring 106 may comprise a snap groove 506 on the inner periphery and a threaded portion 508 on the outer periphery.

When in use, the snap groove 506 of the lens mounting ring 106 may be configured to accommodate a corresponding lens based on the requirement in a snap-fit manner. Further, at least a portion of the threaded portion 508 of the lens mounting ring 106 may be disposed within the first ring adapter slot 324, while the remaining portion of the threaded portion 508 may be configured to be coupled to the camera lens via threads on the threaded portion 508 to mount the lens mounting ring 106 onto the camera lens. The lens mounting ring 106 may comprise different configurations, for example, the rings may have different diameters such as 58MM, 62MM, 67MM, 72MM, 77MM, 82MM or 86MM, etc, based on amount of exposure required for the camera lens.

In an embodiment, the filter base assembly 304 may comprise a filter card slot 502 towards the front side of the filter base frame 305. The filter card slot 502 may be configured to accommodate a magnetic suction frame 504, wherein the magnetic suction frame 504 may be held in its place via the magnetic suction limit ring 314. The magnetic suction frame 504 may be configured to hold special effect filter 110. The series of strong magnets 322 within the magnetic suction limit ring 314 on the rear side of the filter card slot 502 may provide a magnetic grip for holding the special effect filter 110 magnetically within the filter card slot 502. The special effect filter 110 can be an ND mirror or any other special effect filter.

Figure 6A:
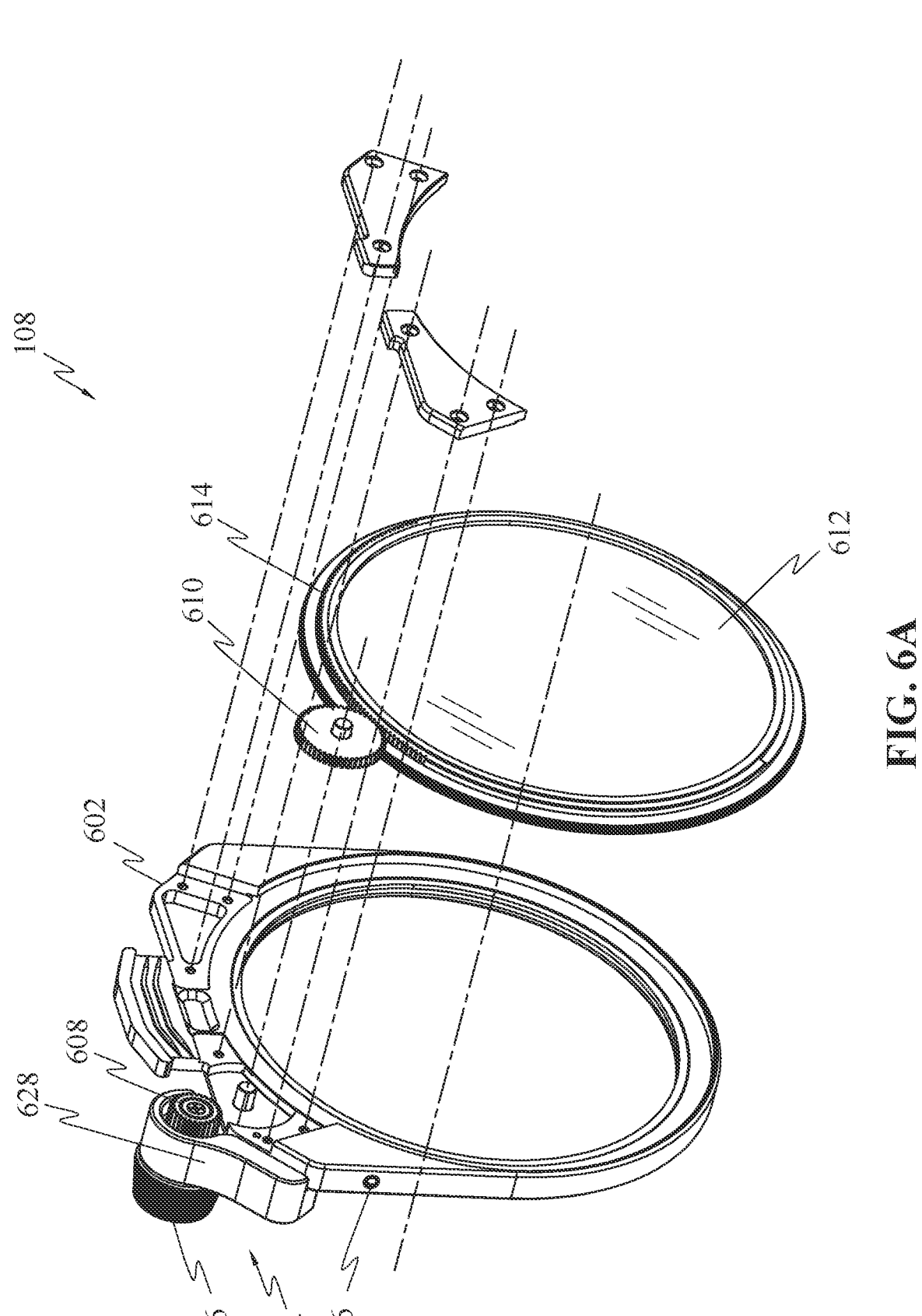
FIG. 6A illustrates a front side view of an adjustable filter holder 108, in accordance with an embodiment.
Figure 6B:
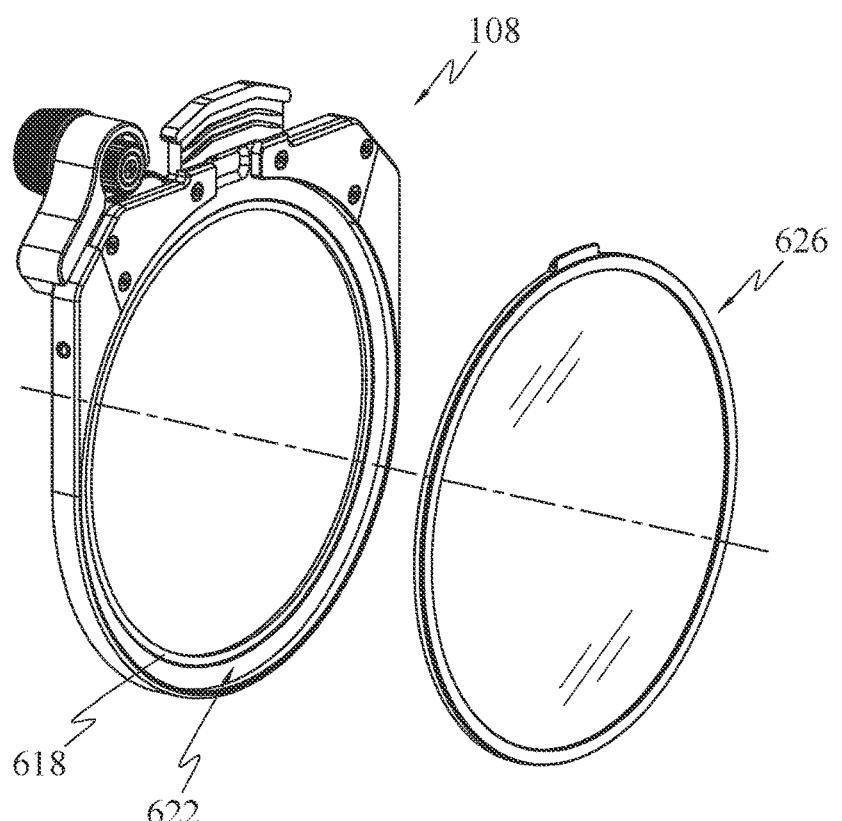
FIG. 6B illustrates an assembly of a magnetic filter 626 in the adjustable filter holder 108 towards the front side of the adjustable filter holder 108, in accordance with an embodiment.
Figure 6C:
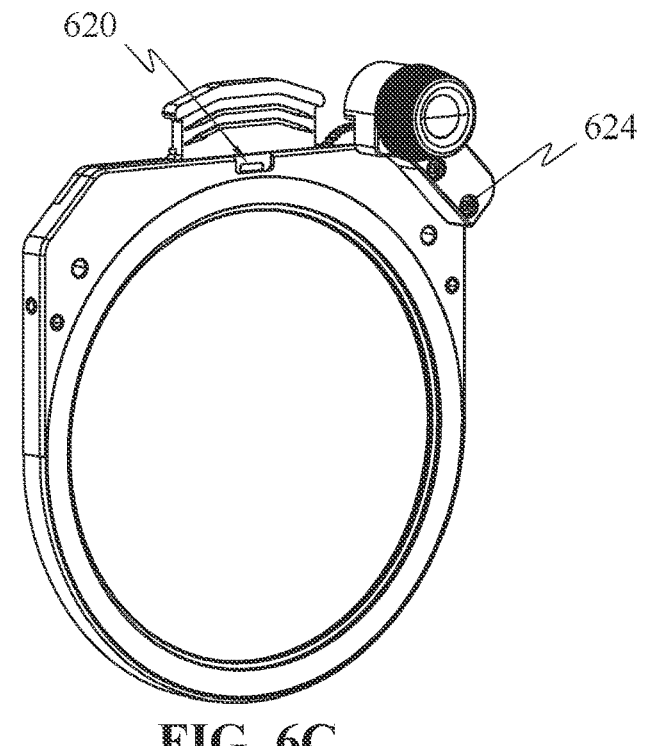
FIG. 6C illustrates a rear side view of the adjustable holder 108, in accordance with an embodiment.

Referring to FIGS. 6A-6C, the adjustable filter holder 108 may comprise a frame body 602 and a gear adjustment means 604. In an embodiment, the frame body 602 may comprise a plurality of positioning glass beads 616, a slave gear 610 and a magnetic positioning slot 620.

In an embodiment, the positioning glass bead 616 may be disposed towards the outer periphery of the frame body 602. The slave gear 610 may be disposed towards the front side of the adjustable filter holder 108. The slave gear 610 may be disposed within the frame body 602 of the adjustable filter holder 108. Further, the magnetic positioning slot 620 may be disposed on the upper middle portion towards the rear side of the frame body 602. The magnetic positioning slot 620 may be disposed towards the first portion 338 of the magnetic button 306 of the filter base assembly 304.

In an embodiment, the gear adjustment means 604 comprise an adjustment knob 606, a gear holder 628 and a main gear 608. The adjustment knob 606 may be disposed towards the rear side of the adjustable filter holder 108. The main gear 608 may be disposed towards the front side on the adjustable filter holder 108. The adjustment knob 606 may be operatively connected to the main gear 608 via the gear holder 628.

In an embodiment, the gear adjustment means 604 may be fixed to the rear side frame body 602 using two M3 screws 624. The two M3 screws 624 may be arranged at an angle of 45° at the upper right corner of a rear side of the frame body 602 (Refer FIG. 6C).

In an embodiment, an inner periphery of the adjustable filter holder 108 may be configured to receive a filter 612. The filter 612 may comprise a frame formed by meshing teeth 614. The meshing teeth 614 on the frame of the filter 612 may be configured to intermesh with the slave gear 610. (Refer FIG. 6A).

The coupling of filter 612 with the adjustable filter holder 108 is discussed in greater detail hereafter. The adjustment knob 606 may be configured to be rotated by a user in a particular direction to focus on an image to be captured. The adjustment knob 606 may be configured to operatively drive the main gear 608 to rotate in the same direction as the adjustment knob 606. Further, the main gear 608 may be configured to intermesh with the slave gear 610 to rotate the slave gear 610 in a direction opposite to the direction of rotation of the main gear 608. The rotation of the slave gear 610 may induce the rotation of the filter 612 via the meshing teeth 614, in a direction opposite to the direction of rotation of the slave gear 610. Thus, the direction of rotation of the filter 612 may be achieved to be same as the direction of rotation of the adjustment knob 606. Further, the angle of rotation of the filter 612 may be in the range of 0°-77°.

In an embodiment, the adjustable filter holder 108 may comprise a second magnetic suction limit ring 618 and a magnetic filter card slot 622. The second magnetic suction limit ring 618 may be disposed on an inner rim of the adjustable filter holder 108 towards the front side of the adjustable filter holder 108. The second magnetic suction limit ring 618 may comprise strong magnets arranged in the form of a ring. The magnetic filter card slot 622 may be disposed towards the front side of second magnetic suction limit ring 618. Referring to FIG. 6B in an alternate embodiment, a magnetic filter 626 may be coupled towards the front side of the adjustable filter holder 108 instead of the filter 612. The magnetic filter card slot 622 may be configured to accommodate the magnetic filter 626. The strong magnets on the second magnetic suction limit ring 618 may be configured to magnetically couple the magnetic filter 626 with magnetic filter card slot 622 for connecting the magnetic filter 626 with the adjustable filter holder 108.

During assembly of the adjustable filter holder 108 with the filter fixing bracket 104, the adjustable filter holder 108 may slide into the filter slot 310. The positioning glass bead 616 may be configured to engage with the filter fixing bracket 104, when the adjustable filter holder 108 is inserted into the filter slot 310 of the filter fixing bracket 104 for snugly fitting the adjustable filter holder 108 within the filter slot 310 without loosening. Further, the adjustable filter holder 108 and the filter fixing bracket 104 may be interlocked with each other via the magnetic positioning slot 620 and the magnetic button 306. The magnetic positioning slot 620 may be configured to position the adjustable filter holder 108 precisely within the filter slot 310. The position of the adjustable filter holder 108 may be limited by the magnetic suction limiter 334, thereby preventing the adjustable filter holder 108 from slipping away from the filter fixing bracket 104.

Figure 7:
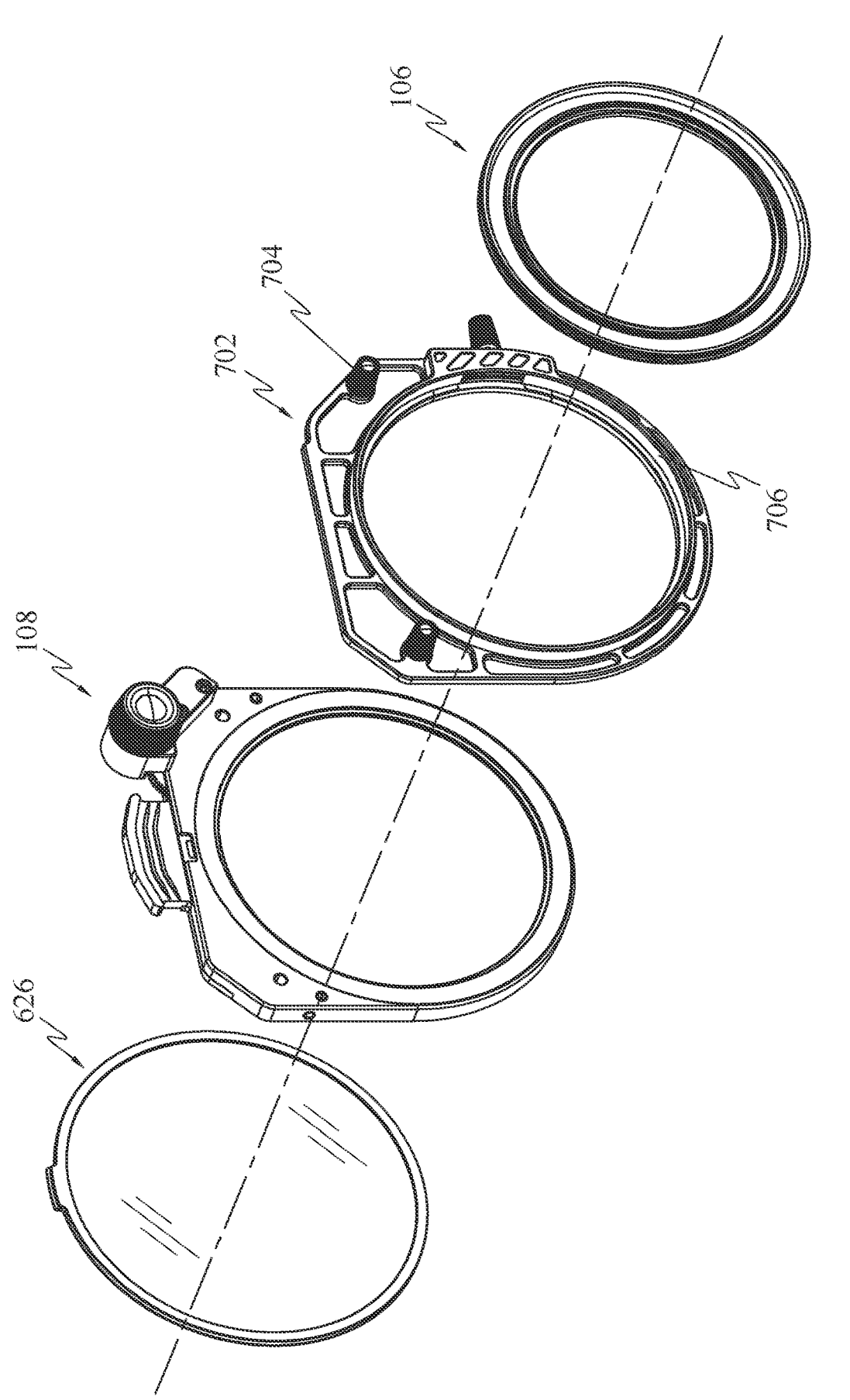
FIG. 7 illustrates the adjustable filter holder 108 with a portable collar 702, in accordance with an embodiment.

FIG. 7 illustrates an assembly of the adjustable filter holder 108 and a portable collar 702, in accordance with an embodiment. The portable collar 702 may comprise a pair of M4 screws 704 and a second ring adapter slot 706. The rear side of the adjustable filter holder 108 may be coupled to a front side of the portable collar 702 using the pair of M4 screws 704. The second ring adapter slot 706 may be disposed at a centre portion of the portable collar 702. The second ring adapter slot 706 may be configured to receive the lens mounting ring 106, wherein the lens mounting ring 106 may be fastened and fixed to the second ring adapter slot 706. The portable collar 702 may be configured to be mounted onto the camera lens via the lens mounting ring 106. The adjustable filter holder 108 may be configured to be mounted onto the camera lens via the portable collar 702 in the absence of the filter fixing bracket 104. The portable collar 702 may enable engagement of a variety of magnetic filters 626 (that may be used interchangeably via the adjustable filter holder 108) onto the camera lens.

The light-shielding plate 202 of the present invention may be detachable, and the up and down angle of the light-shielding plate 202 can be adjusted to realize a multi-angle light-shielding function of the light-shielding plate 202. Further, the mechanical clamping and fixing method of the traditional special effect filter may be replaced by magnetic suction fixing method to enhance the ease of filter installation and switching.

Also, different types of filters may be used in a combined manner in the present invention. The special effect filter 110 may be magnetically fixed on the filter fixing bracket 104. The special effect filter 110 may be either a neutral density (ND) filter or any other special effect filters. Also, the filters may include circular polarizer/linear (CPL) filter or VND magnetic filter 626 held within the adjustable filter holder 108. Alternately, the magnetic filter 626 in the adjustable filter holder 108 can be magnetically connected to another magnetically fixed filter to form an adjustable graduated neutral density (GND) filter.

The multifunctional light-shielding bucket can be used with a variety of lens mount rings, that is, it can be used with most caliber lenses, and can be used in combination with a variety of filters with different functions to produce a variety of images that enrich the shooting effect. The multifunctional light-shielding bucket provides magnetically fixing design, fast installation and replacement, and improved filter switching efficiency.

It shall be noted that the processes described above are described as sequence of steps; this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications; these should not be construed as limiting the scope of the invention but as merely providing illustrations of some of the personally preferred embodiments of this invention. Thus, the scope of the invention should be determined by the apprised claims and their legal equivalents rather than by the examples given.

What is claimed is:

1. A multifunctional light-shielding bucket, comprising:
a light-shielding bucket body, wherein the light shielding bucket body comprises:
a light-shielding bucket frame; and
a light-shielding plate installed towards a front side of the light-shielding bucket body, wherein the light-shielding bucket frame is coupled to the light-shielding plate via a mounting block and a connecting support;
an adjustable filter holder;
a lens mounting ring, wherein the lens mounting ring comprises a magnetic coupling surface configured to engage a complementary magnetic adapter ring, the magnetic adapter ring having a threaded portion for mounting to a front portion of a camera lens barrel, and magnets for magnetic coupling with the lens mounting ring; and
a portable collar, wherein the portable collar comprises:
a pair of M4 screws, wherein the pair of M4 screws are configured to couple the adjustable filter holder towards a front side of the portable collar; and
a second ring adapter slot disposed towards a rear side of the portable collar, wherein the lens mounting ring is fastened and fixed within the second ring adapter slot.

2. The multifunctional light-shielding bucket according to claim 1, wherein the mounting block comprises a cylindrical groove configured to receive a damping sleeve.

3. The multifunctional light-shielding bucket according to claim 2, wherein the damping sleeve is configured to:
rotatably couple the connecting support to the mounting block; and
receive a damping pin provided on the connecting support.

4. The multifunctional light-shielding bucket according to claim 1, wherein a front side of a filter fixing bracket is coupled to a rear side of the light-shielding bucket body, wherein the filter fixing bracket comprises:
a filter base assembly; and
a graduated neutral density (GND) filter holder assembly, wherein a filter slot is defined between the GND filter holder assembly and the filter base assembly, wherein the filter slot is configured to receive the adjustable filter holder.

5. The multifunctional light-shielding bucket according to claim 4, wherein the light-shielding bucket body is configured to be detachably coupled to the filter fixing bracket via a pair of longitudinal protruding members provided on each of the inner walls of the light-shielding bucket frame.

6. The multifunctional light-shielding bucket according to claim 5, wherein at least one of the longitudinal protruding members is provided on an actuating member in a manner that the at least one of the longitudinal protruding members faces an aperture of the light-shielding bucket frame and at least another of the longitudinal protruding members is provided on the light-shielding bucket frame opposite to the actuating member.

7. The multifunctional light-shielding bucket according to claim 6, wherein the longitudinal protruding members is configured to snap on to the front side of the filter fixing bracket by operating the actuating member.

8. The multifunctional light-shielding bucket according to claim 4, wherein the filter base assembly comprises:
a filter base frame comprising:
a rectangular slot, wherein the rectangular slot is configured to receive a magnetic button, wherein the magnetic button comprises:
a first portion disposed towards the front side of the filter base frame;
a second portion disposed towards the rear side of the filter base frame;
a connecting rod configured to couple the first portion and the second portion of the magnetic button, wherein the connecting rod extend sideways slightly beyond lateral sides of the second portion; and
a magnetic suction limiter portion extending from an inner wall of the second portion of the magnetic button;
at least one ring locker slot disposed on lateral sides of the filter base frame; and
a first ring adapter slot configured to receive the lens mounting ring.

9. The multifunctional light-shielding bucket according to claim 8, wherein the ring locker slot is provided with a clamper slot, in a manner that the clamper slot provides access from the ring locker slot to an aperture of the filter base frame.

10. The multifunctional light-shielding bucket according to claim 8, wherein the ring locker slot is configured to receive a ring locking means, wherein the ring locking means comprises:
a sliding block comprising an L-shaped clamping block configured to securely engage the lens mounting ring on the filter base frame; and
a stopper for limiting the sliding movement of the sliding block, wherein the stopper comprises:
a plurality of springs for enabling the snap fitting movement of the L-shaped clamping block;
a limit post to limit the outward movement of the L-shaped clamping block;
a limiting slot; and
a fastening screw configured to rigidly engage the filter fixing bracket with the lens mounting ring.

11. The multifunctional light-shielding bucket according to claim 8, wherein the filter base frame comprises a filter card slot, wherein a front side of the filter card slot is configured to receive a special effect filter using a magnetic suction limit ring disposed on a rear side of the filter card slot.

12. The multifunctional light-shielding bucket according to claim 11, wherein the special effect filter comprises a magnetic suction frame, wherein the magnetic suction frame is configured to magnetically couple with the filter card slot, when the special effect filter is placed in the filter fixing bracket.

13. The multifunctional light-shielding bucket according to claim 4, wherein the GND filter holder assembly is configured to receive a graduated neutral density (GND) filter, wherein the GND filter assembly comprises:

a first frame; and a pair of clamping members configured to be rigidly fixed to a front side of the first frame, wherein:

an outer wall of each of the clamping members is provided with at least an installation slot for mounting the light shielding body onto the filter fixing bracket;

an inner wall of each of the clamping members comprises a pair of first grooves; and a pair of gripping members, wherein each of the first grooves receives the corresponding gripping members such that a first side of the gripping member is embedded within the first groove, while a second side of each of the gripping member protrudes slightly beyond the inner wall of the clamping members.

14. The multifunctional light-shielding bucket according to claim 1, wherein the adjustable filter holder comprises:

a frame body comprising:

a magnetic positioning slot;

a plurality of positioning glass beads; and a slave gear; and a gear adjustment means fixed to the frame body, wherein the gear adjustment means comprises:

an adjustment knob;

a main gear; and a gear holder to operably connect the adjustment knob to the main gear.

15. The multifunctional light-shielding bucket according to claim 14, wherein the gear adjustment means is fixed to the frame body using M3 screws positioned at an angle of 45° on an upper right corner towards a rear side of the frame body.

16. The multifunctional light-shielding bucket according to claim 14, wherein, the adjustment knob is configured to drive the main gear when the adjustment knob is operated in a particular direction; and the main gear is configured to intermesh with the slave gear to rotate the slave gear in a direction opposite to the direction of rotation of the main gear.

17. The multifunctional light-shielding bucket according to claim 14, wherein the adjustable filter holder is configured to receive a filter comprising a frame formed by meshing teeth, wherein the meshing teeth is configured to intermesh with the slave gear, such that the rotation of the slave gear induces rotation of the filter in a direction opposite to the slave gear.

18. The multifunctional light-shielding bucket according to claim 14, the adjustable filter holder comprises:

a magnetic filter card slot configured to accommodate a magnetic filter; and a second magnetic suction limit ring disposed on an inner rim of the adjustable filter holder, wherein the second magnetic suction limit ring comprises strong magnets arranged in the form of a ring, wherein the second magnetic suction limit ring is configured to magnetically couple the magnetic filter with magnetic filter card slot for connecting the magnetic filter with the adjustable filter holder.

19. The multifunctional light-shielding bucket according to claim 1, wherein the lens mounting ring comprises:

a snap groove on an inner periphery of the lens mounting ring; and the lens connecting threaded portion on an outer periphery of the lens mounting ring, wherein the lens connecting threaded portion is configured to be threaded to the camera lens to mount the multifunctional light-shielding bucket onto a camera equipment.

*    *    *    *    *